US011174916B2

(12) United States Patent
Desjardins

(10) Patent No.: US 11,174,916 B2
(45) Date of Patent: Nov. 16, 2021

(54) AIRCRAFT ENGINE REDUCTION GEARBOX

(71) Applicant: PRATT & WHITNEY CANADA CORP., Longueuil (CA)

(72) Inventor: Michel Desjardins, St-Hubert (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 130 days.

(21) Appl. No.: 16/360,297

(22) Filed: Mar. 21, 2019

(65) Prior Publication Data

US 2020/0300340 A1    Sep. 24, 2020

(51) Int. Cl.
*F16H 1/28*    (2006.01)
*F16H 57/08*    (2006.01)
(Continued)

(52) U.S. Cl.
CPC .................. *F16H 1/28* (2013.01); *F02C 7/36* (2013.01); *F02K 3/06* (2013.01); *F16H 57/08* (2013.01); *F05D 2220/323* (2013.01); *F05D 2260/40311* (2013.01); *F16H 2001/2881* (2013.01); *F16H 2057/085* (2013.01)

(58) Field of Classification Search
CPC .................. F16H 1/28; F16H 2001/289; F16H 2001/2881; F16H 2001/2872; F02C 7/36; F05D 2260/40311
See application file for complete search history.

(56) References Cited

U.S. PATENT DOCUMENTS

| 1,417,797 | A | * | 5/1922 | Cook | F16H 1/2836 |
| | | | | | 475/342 |
| 2,700,311 | A | * | 1/1955 | Bade | B64D 35/04 |
| | | | | | 475/330 |

(Continued)

FOREIGN PATENT DOCUMENTS

| CA | 2562290 C | 10/2013 |
| CA | 3016717 A1 | 3/2019 |

(Continued)

OTHER PUBLICATIONS

European Search Report dated Jun. 5, 2020, Application Serial No. 20164853.2.

(Continued)

*Primary Examiner* — Ernesto A Suarez
*Assistant Examiner* — Lillian T Nguyen
(74) *Attorney, Agent, or Firm* — Norton Rose Fulbright Canada LLP

(57) ABSTRACT

An aircraft engine reduction gearbox includes a power input and a power output, and an epicyclic gear train engaged with the power input and the power output. The epicyclic gear train includes a sun gear engaged with the power input and centrally disposed to define a center axis of the epicyclic gear train. Compound planet gears are mounted to a carrier and rotatable about respective planet gear axes. Each compound planet gear has an input gear in meshed engagement with the sun gear, and output gears axially spaced from the input gear. Ring gears are axially spaced apart and rotatable about the center axis. The ring gears are engaged with the power output. Each ring gear is in meshed engagement with one of the output gears.

18 Claims, 3 Drawing Sheets

(51) Int. Cl.
   *F02C 7/36* (2006.01)
   *F02K 3/06* (2006.01)

(56) References Cited

U.S. PATENT DOCUMENTS

| | | |
|---|---|---|
| 5,152,668 A | 10/1992 | Bulman et al. |
| 5,154,372 A | 10/1992 | Hora et al. |
| 5,310,391 A * | 5/1994 | Takahashi ............. F16H 1/2809 475/338 |
| 5,366,422 A | 11/1994 | Dye et al. |
| 6,735,954 B2 | 5/2004 | Macfarlane |
| 7,055,303 B2 | 6/2006 | MacFarlane |
| 7,104,918 B2 | 9/2006 | Mitrovic |
| 7,223,197 B2 | 5/2007 | Poulin |
| 7,364,526 B2 | 4/2008 | Cho |
| 7,500,935 B2 | 3/2009 | Waide |
| 9,145,834 B2 | 9/2015 | Frost et al. |
| 9,752,500 B2 | 9/2017 | Ullyott |
| 9,890,704 B2 | 2/2018 | Speak et al. |
| 10,215,055 B2 | 2/2019 | Curlier et al. |
| 10,240,522 B2 | 3/2019 | Jones et al. |
| 10,364,752 B2 | 7/2019 | Moniz et al. |
| 10,371,060 B2 | 8/2019 | Lamarre et al. |
| 10,371,170 B2 | 8/2019 | Yu |
| 10,378,438 B2 | 8/2019 | Skertic |
| 10,385,785 B2 | 8/2019 | MacFarlane et al. |
| 10,393,027 B2 | 8/2019 | Lefebvre et al. |
| 10,422,243 B2 | 9/2019 | Suciu et al. |
| 10,422,286 B2 | 9/2019 | Le Pache et al. |
| 10,458,422 B2 | 10/2019 | Gomanne et al. |
| 10,465,611 B2 | 11/2019 | Durocher et al. |
| 10,473,035 B2 | 11/2019 | Brault et al. |
| 10,519,871 B2 | 12/2019 | Desjardins et al. |
| 10,526,975 B2 | 1/2020 | Howell et al. |
| 10,526,976 B2 | 1/2020 | Suciu et al. |
| 10,526,977 B2 | 1/2020 | Corpron |
| 10,533,559 B2 | 1/2020 | Plante et al. |
| 10,539,065 B2 | 1/2020 | Julien et al. |
| 10,539,076 B2 | 1/2020 | Niergarth et al. |
| 10,544,733 B2 | 1/2020 | Julien |
| 10,550,764 B2 | 2/2020 | Roberge |
| 10,563,513 B2 | 2/2020 | Kalitzin et al. |
| 10,563,591 B2 | 2/2020 | Muldoon |
| 10,563,593 B2 | 2/2020 | McNeil et al. |
| 2009/0062058 A1 | 3/2009 | Kimes et al. |
| 2009/0233754 A1 * | 9/2009 | Pedersen .................. F16H 3/66 475/296 |
| 2011/0305572 A1 * | 12/2011 | Bellis ...................... B64C 11/48 416/129 |
| 2012/0317991 A1 | 12/2012 | Frost et al. |
| 2014/0083107 A1 * | 3/2014 | Sheridan .................. F02C 7/00 60/772 |
| 2015/0354672 A1 * | 12/2015 | Bouwer .................... F16H 1/28 244/62 |
| 2016/0010562 A1 * | 1/2016 | Sheridan ................. F02C 3/107 415/124.1 |
| 2016/0040601 A1 | 2/2016 | Frost et al. |
| 2016/0230843 A1 | 8/2016 | Duong |
| 2017/0198786 A1 | 7/2017 | Chhuor |
| 2018/0216531 A1 * | 8/2018 | McCune .................. F02C 7/36 |
| 2018/0334964 A1 * | 11/2018 | Desjardins ............... F02C 7/06 |
| 2019/0024582 A1 | 1/2019 | Poulin |
| 2019/0032920 A1 | 1/2019 | Giambra et al. |
| 2019/0048802 A1 | 2/2019 | Desjardins et al. |
| 2019/0128181 A1 | 5/2019 | Smith |
| 2019/0145322 A1 | 5/2019 | Sellick et al. |
| 2019/0234242 A1 | 8/2019 | Ramakrishnan et al. |
| 2019/0257246 A1 | 8/2019 | Higgins |
| 2019/0323436 A1 | 10/2019 | Mitrovic |
| 2019/0338670 A1 | 11/2019 | Reid |
| 2019/0338705 A1 | 11/2019 | Reid |
| 2019/0360356 A1 | 11/2019 | Savaria et al. |
| 2019/0376595 A1 | 12/2019 | Meyer et al. |
| 2019/0376596 A1 | 12/2019 | Clark et al. |
| 2019/0383215 A1 | 12/2019 | Sheaf et al. |
| 2020/0003157 A1 | 1/2020 | Clements et al. |
| 2020/0011241 A1 | 1/2020 | Karam |
| 2020/0025102 A1 | 1/2020 | Kallianteris et al. |
| 2020/0049026 A1 | 2/2020 | Hughes et al. |
| 2020/0056507 A1 | 2/2020 | Walker |
| 2020/0056543 A1 | 2/2020 | Walker |
| 2020/0062382 A1 | 2/2020 | Schank |

FOREIGN PATENT DOCUMENTS

| | | |
|---|---|---|
| CA | 3040560 A1 | 10/2019 |
| CA | 3011124 C | 1/2020 |
| CA | 2822965 C | 2/2020 |
| CN | 10551834 | 4/2019 |
| CN | 105518347 | 4/2019 |
| CN | 109723559 A | 5/2019 |
| EP | 2535544 A2 | 12/2012 |
| EP | 3135882 A1 | 3/2017 |
| EP | 3361122 | 8/2018 |
| EP | 3361122 A1 | 8/2018 |
| EP | 3135920 B1 | 12/2018 |
| EP | 2261467 B1 | 1/2019 |
| EP | 2519722 B1 | 2/2019 |
| EP | 2917590 B1 | 3/2019 |
| EP | 3460182 A1 | 3/2019 |
| EP | 3070304 B1 | 4/2019 |
| EP | 3464833 A2 | 4/2019 |
| EP | 2728140 B1 | 6/2019 |
| EP | 3092396 B1 | 9/2019 |
| EP | 3538751 A1 | 9/2019 |
| EP | 2472081 B1 | 10/2019 |
| EP | 3555447 A1 | 10/2019 |
| EP | 3557009 A1 | 10/2019 |
| EP | 3557010 A1 | 10/2019 |
| EP | 3561263 A1 | 10/2019 |
| EP | 3054128 B1 | 11/2019 |
| EP | 3565987 | 11/2019 |
| EP | 3565987 A1 | 11/2019 |
| EP | 3567283 | 11/2019 |
| EP | 3567283 A1 | 11/2019 |
| EP | 2540989 B1 | 12/2019 |
| EP | 3283369 B1 | 12/2019 |
| EP | 2943670 B1 | 1/2020 |
| EP | 3059387 B1 | 1/2020 |
| EP | 3339610 B1 | 1/2020 |
| EP | 3597884 A1 | 1/2020 |
| EP | 3159578 B1 | 2/2020 |
| FR | 3069020 B1 | 8/2019 |
| GB | 2351121 | 12/2000 |
| JP | 06556157 B2 | 8/2019 |
| JP | 36556157 B2 | 8/2019 |
| WO | 2017198999 A1 | 11/2017 |

OTHER PUBLICATIONS

A New Approach to Turboshaft Engine Growth, M. A. Compagnon, General Electric Company, Lynn, Massachusetts pp. 80-41-1 to 80-41-6, May 13, 1980.
European Search Report, EP20164853.2, dated Jun. 5, 2020.
European Search Report, EP18156221.6, dated Jul. 5, 2018.

* cited by examiner

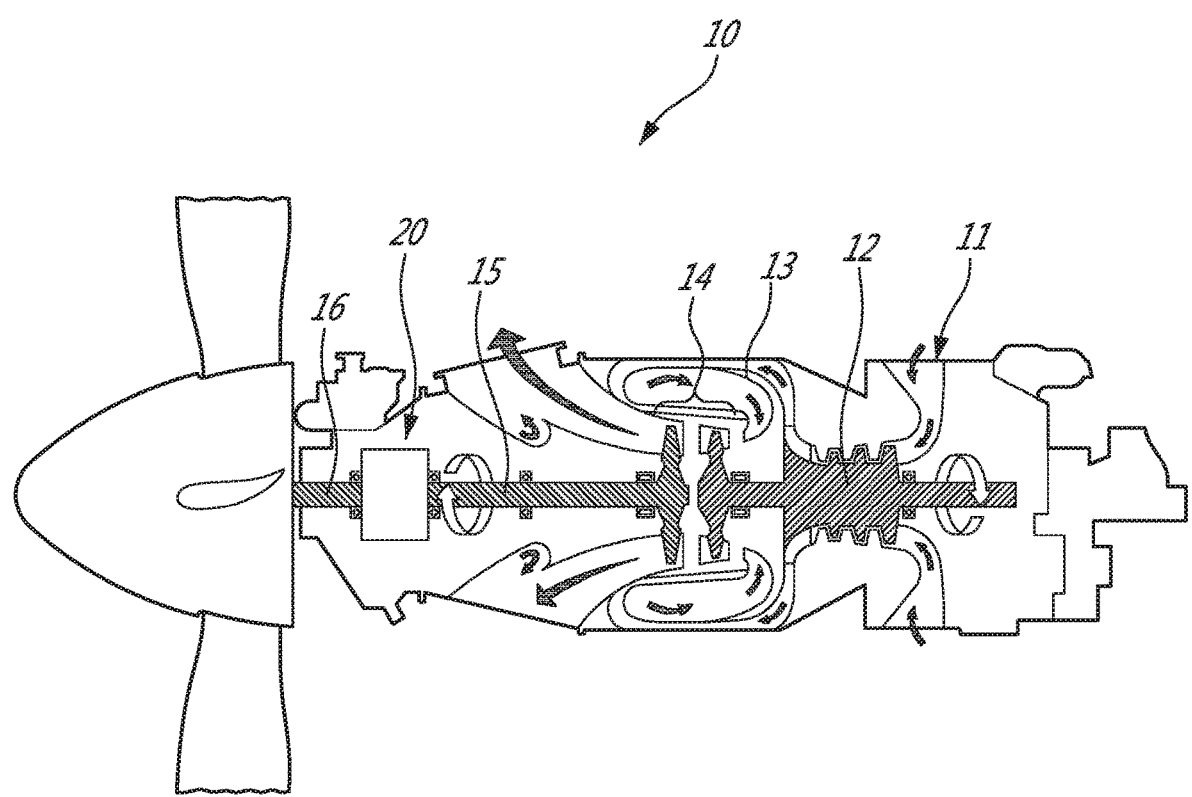

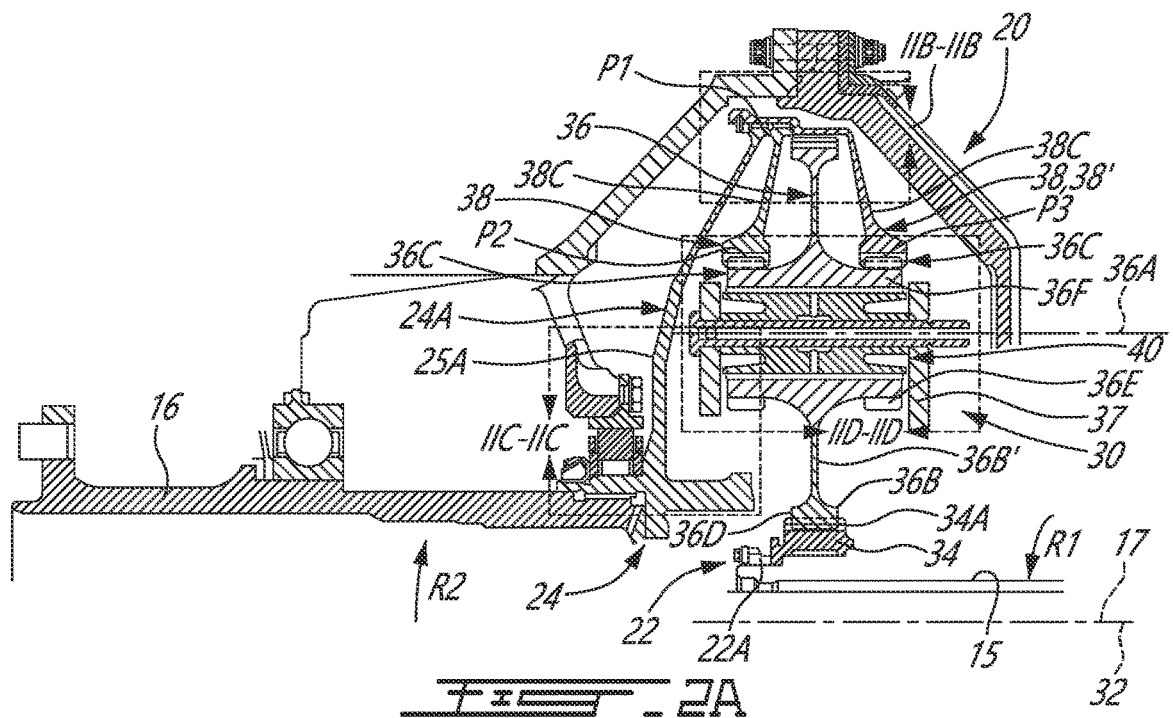
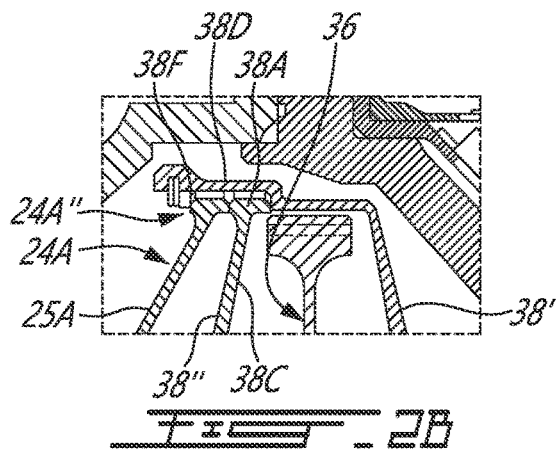
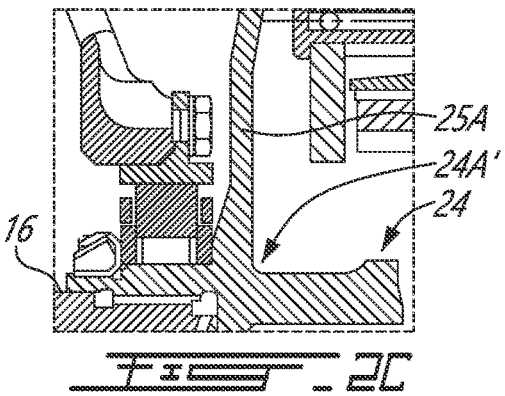
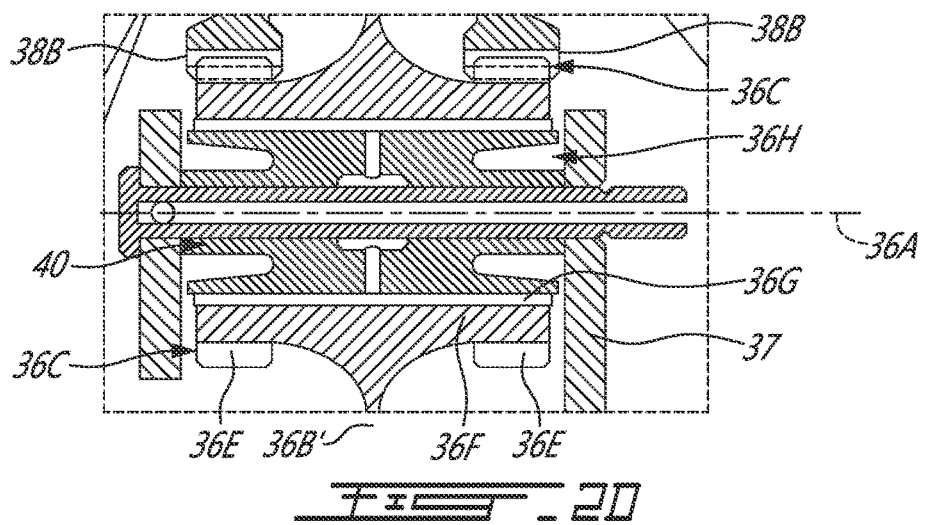

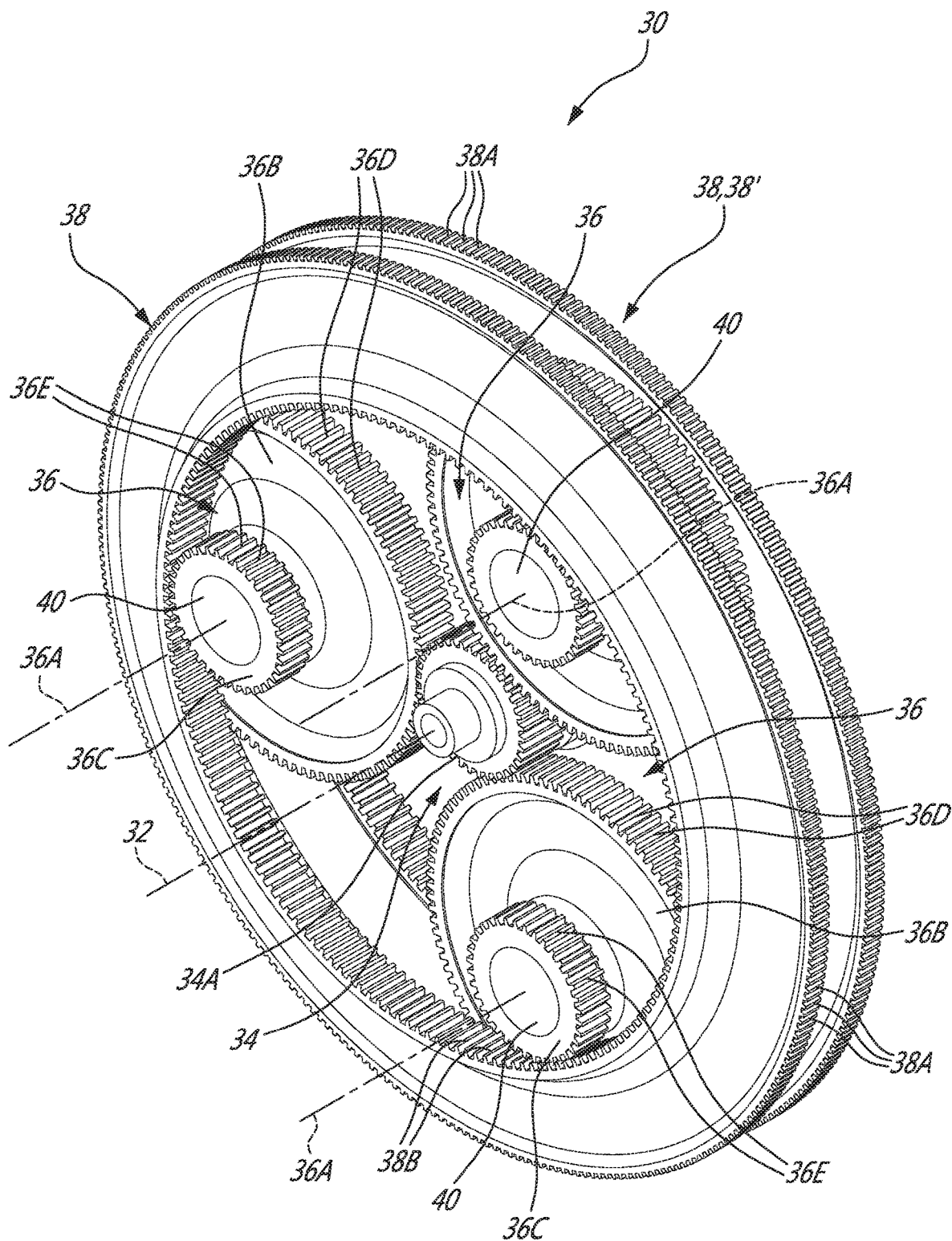

AIRCRAFT ENGINE REDUCTION GEARBOX

TECHNICAL FIELD

The application relates generally to aircraft engines and, more particularly, to aircraft engines with reduction gearboxes.

BACKGROUND

Aircraft engines may include a reduction gearbox (RGB) which provides a speed reduction while carrying the torque increase at lower speed.

RGBs contribute to the weight, cost and size of the engine, and may also impose oil flow requirements for lubrication and cooling, which in turn impact the oil system components of the engine, such as the pump, tank, and cooler. The rejection of heat generated by the components of the RGB during its operation may negatively impact overall engine efficiency.

SUMMARY

In an aspect, there is provided an aircraft engine reduction gearbox, comprising: a power input and a power output; and an epicyclic gear train engaged with the power input and the power output, the epicyclic gear train including: a sun gear engaged with the power input and centrally disposed defining a center axis of the epicyclic gear train; compound planet gears mounted to a carrier and rotatable about respective planet gear axes, each compound planet gear having an input gear in meshed engagement with the sun gear, and output gears axially spaced from the input gear; and ring gears axially spaced apart from each other, the ring gears rotatable about the center axis and engaged with the power output, each ring gear in meshed engagement with one of the output gears.

In an aspect, there is provided a method of operating a reduction gearbox of an aircraft engine, the reduction gearbox having an epicyclic gear train with a sun gear, compound planet gears, and axially spaced-apart ring gears, the method comprising: driving the sun gear to rotate an input gear of the compound planet gears, and to rotate output gears of the compound planet gears axially spaced from the input gear, rotation of the output gears rotating the ring gears about a center axis of the epicyclic gear train.

DESCRIPTION OF THE DRAWINGS

Reference is now made to the accompanying figures in which:

FIG. 1 is a schematic cross-sectional view of a gas turbine engine;

FIG. 2A is a cross-sectional view of part of a reduction gearbox of the gas turbine engine in FIG. 1;

FIG. 2B is an enlarged view of area IIB-IIB in FIG. 2A;
FIG. 2C is an enlarged view of area IIC-IIC in FIG. 2A;
FIG. 2D is an enlarged view of area IID-IID in FIG. 2A; and FIG. 3 is a perspective view of an epicyclic gear train of the reduction gearbox of FIG. 2A.

DETAILED DESCRIPTION

FIG. 1 illustrates a gas turbine engine 10 commonly referred to as a "turboprop", and of a type preferably provided for use in subsonic flights, generally comprising in serial flow communication an intake 11 through which air is drawn to subsequently be compressed by compressors 12. Fuel is added to the compressed air in a combustor 13 for the combustion of the fuel and air mixture. Combustion gasses then expand to drive turbines 14. A power shaft 15 connected to one of the turbines 14 projects to transmit a rotatable driving force to a propeller shaft 16. Although the engine 10 shown in FIG. 1A is configured for driving a propeller of an aircraft, the engine 10 in an alternate embodiment is a turboshaft engine configured to drive the rotor of a helicopter, or the fan of a "turbofan" engine. Any suitable engine may be employed.

The engine 10 has a transmission, including a reduction gearbox 20, engaged with the power and propeller shafts 15,16. The reduction gearbox 20 (sometimes referred to herein as "RGB 20") allows for the controlled application of power from the power shaft 15 to the propeller shaft 16. As will be explained in greater detail below, the RGB 20 includes gears, gear trains, and other gear arrangements to provide speed and torque conversions from the rotating power and propeller shafts 15,16.

Referring to FIG. 2A, the RGB 20 has a power input 22 and a power output 24. The power input 22 and the power output 24 are both rotatable about a longitudinal center axis 17 of the engine 10. The power input 22 is any mechanical object or coupling which links the RGB 20 to a power source of the engine 10 and through which motive power is provided to the RGB 20. The power output 24 is any mechanical object or coupling which links the RGB 20 to a driven component of the engine 10 and through which motive power is conveyed from the RGB 20. The power output 24 is a rotatable driven member that functions to drive a rotatable load such as the propeller of an aircraft, the rotor of a helicopter, a fan of the engine, or the reduction gearboxes associated with the aircraft propeller and helicopter rotor. For example, in FIG. 2A, the power input 22 includes a coupling 22A mounted to the power shaft 15 to receive a rotational input therefrom, and the power output 24 includes a spline 24A mounted to the propeller shaft 16 to convey thereto a torque output of the RGB 20. In FIG. 2A, the coupling 22A and the spline 24A are rotatable and coaxial about the center axis 17 of the engine 10 and axially spaced apart from each other. In alternate embodiments, the power input 22 and the power output 24 are radially offset. In an alternate embodiment, the power input 22 is embodied as a gearing arrangement which is engaged to, and driven by, the power shaft 15. In the depicted embodiment, the power output 24 is the sole or single source of power for the main load of the engine 10, namely, the propeller, the rotor, or their respective reduction gearboxes. The power output 24 in the depicted embodiment is therefore the only power output to drive the propeller, the rotor, or their respective reduction gearboxes.

Referring to FIG. 2A, the RGB 20 also includes an epicyclic gear train 30. The epicyclic gear train 30, which in the depicted embodiment is a "star" type gear train, is engaged with the power input 22 to be driven thereby, and is engaged with the power output 24 to drive the power output 24. By "engaged", it is understood that the rotation of components of the epicyclic gear train 30 allows power from the power input 22 to be transferred to the power output 24.

In FIG. 2A, the epicyclic gear train 30 is the only epicyclic gear train of the RGB 20. In FIG. 2A, the epicyclic gear train 30 is the only epicyclic gear train positioned between the power input 22 of the RGB 20 and the power output 24 of the RGB 20. In FIG. 2A, only one epicyclic gear train 30 engages both the power input 22 of the RGB 20 and the power output 24. The RGB 20 is therefore a "single stage" RGB 20, and uses only one epicyclic gear train 30 to achieve speed reduction and torque conversion. In contrast, some conventional reduction gearboxes have multiple epicyclic gear systems, which may be arranged in series such that the output of one of the epicyclic gear systems is the input for another of the epicyclic gear systems, in order to achieve the desired speed reduction and torque conversion. The use of multiple epicyclic gear systems may create weight and space penalties.

The epicyclic gear train 30 includes a sun gear 34. The sun gear 34 is centrally disposed in the epicyclic gear train 30, and defines a center axis 32 of the epicyclic gear train 30. The center axis 32 in FIG. 2A is collinear with the center axis 17 of the engine 10. The outer circumferential periphery of the sun gear 34 is located closer to the center axis 32 of the epicyclic gear train 30 than all other rotating components of the epicyclic gear train 30. The sun gear 34 is engaged with the power input 22 to be driven thereby about the center axis 32. In FIG. 2A, the sun gear 34 is coupled to the coupling 22A of power input 22 to receive rotational input from the power shaft 15. The sun gear 34 has sun gear teeth 34A. As shown in FIG. 2A, the power input 22 is coaxial with the sun gear 34.

The epicyclic gear train 30 also has multiple compound planet gears 36 which mesh with the sun gear 34, and are driven thereby. The compound planet gears 36 mesh with the inside of ring gears 38 of the epicyclic gear train 30. The compound planet gears 36 therefore mesh with both the sun gear 34 and the ring gears 38. The compound planet gears 36 are mounted to a carrier 37 which extends between and connects the center of the compound planet gears 36. Each compound planet gear 36 is rotatable about its own planet gear axis 36A. In FIG. 2A, the planet gear axes 36A are radially spaced apart from center axis 32. The planet gear axes 36A are parallel to each other, and to the center axis 32. It will therefore be appreciated that the power provided by the sun gear 34 to the compound planet gears 36 may cause them to rotate about themselves and their planet gear axes 36A.

Each compound planet gear 36 includes differently-sized gear engaging elements for engaging different components of the epicyclic gear train 30. Each compound planet gear 36 may thus be referred to as a "stepped-planet" gear. The presence of the compound planet gears 36 may allow the RGB 20 to achieve the desired speed reduction and torque conversion using only the single epicyclic gear train 30 shown in FIG. 2A, thus avoiding the need for two stages of epicyclic gear reduction. Each compound planet gear 36 includes an input gear 36B and output gears 36C. Each input and output gear 36B,36C is a portion of the compound planet gear 36 with teeth, splines, or other similar elements which mesh with the teeth of another gear separate from the same compound planet gear 36. The input and output gears 36B,36C are coaxial and concentric.

The input gear 36B is in meshed engagement with the sun gear 34 to receive a rotational drive from the sun gear 34, thereby causing the compound planet gear 36 to rotate about its planet gear axis 36A. In FIG. 2A, the sun gear teeth 34A are meshed with the input gear teeth 36D of each compound planet gear 36 to transmit rotation from the sun gear 34 to the compound planet gears 36. The output gears 36C are spaced from the input gear 36B along the direction of the planet gear axis 36A. The output gears 36C are axially spaced apart from each other. The compound planet gear 36 shown in FIG. 2A has two output gears 36C, but more are possible.

For the compound planet gear 36 shown in FIG. 2A, the input gear 36B is positioned axially between the output gears 36C. The output gears 36C are thus positioned on the compound planet gear 36 on opposite axial sides of the input gear 36B. The two output gears 36C are axially spaced equidistantly from the input gear 36B. A diameter of the input gear 36B is greater than a diameter of the output gears 36C. The radial distance of the input gear teeth 36D from the planet gear axis 36A is greater than the radial distance of output gear teeth 36E of the output gears 36C from the planet gear axis 36A. This arrangement of the differently-sized gears 36B,36C may help achieve speed reduction and torque conversion in a relatively compact volume, as described in greater detail below. The output gears 36C in FIG. 2A have the same diameter. The input and output gears 36B,36C are rigidly connected together and rotate at the same rotational speed about the planet gear axis 36A. The input and output gears 36B,36C are integral with one another. Each compound planet gear 36 in the depicted embodiment is a unitary structure. Each compound planet gear 36 in the depicted embodiment is a single-piece structure or a single part. Each compound planet gear 36 in the depicted embodiment includes a pair of concentric output gears 36C rigidly connected to each side of the larger input gear 36B. Such a compound planet gear 36 may offer an additional speed reduction when compared to a conventional star-type gear system which does not have compound planet gears.

Each compound planet gear 36 may have any suitable structure with the input and output gears 36A,36B, an example of which is described with reference to FIGS. 2A and 2D. The compound planet gears 36 have a central body 36F being coaxial with the planet gear axis 36A. The central body 36F is annular, and hollow along at least part of its axial length. Referring to FIG. 2D, an inner journal surface 36G of the body 36F delimits a central cavity 36H of the body 36F which is also coaxial with the planet gear axis 36A. Referring to FIG. 2A, the input gear 36B includes an input gear web 36B' extending radially outwardly from the body 36F to a peripheral end having the input gear teeth 36D. The output gears 36C are positioned at axially opposite ends of the body 36F, and include the output gear teeth 36E. Other structures and arrangement of components for the compound planet gear 36 are possible.

Still referring to FIG. 2A, the ring gears 38 are axially spaced apart from each another along the direction of the center axis 32 of the epicyclic gear train 30. The ring gears 38 are rotatable about the center axis 32. The ring gears 38 are engaged, directly or indirectly, with the power output 24 to transmit the torque and reduced speed from the RGB 20 to a component to be driven, such as the propeller shaft 16. FIG. 2A shows two ring gears 38, but more may be used, the number of ring gears 38 typically corresponding to the number of output gears 36B.

The ring gears 38 receive a rotational input from the compound planet gears 36. Each ring gear 38 is in meshed engagement with one of the output gears 36C. It will thus be appreciated that the input gears 36B of the compound planet gears 36 receive a rotational input from the sun gear 34, and the output gears 36C of the compound planet gears 36 output the same rotational input to the ring gears 38. The epicyclic gear train 30 in FIG. 2A is thus an epicyclic star gear system having compound planet gears 36 with concentric gears 36B,36C, and axially spaced-apart output ring gears 38 engaging the axially spaced-apart sets of the output gear teeth 36E of the compound planet gears 36. The epicyclic gear train 30 with its arrangement of compound planet gears 36 engaging different ring gears 38 may provide an additional speed reduction when compared to a conventional star type gear system.

One possible configuration for the ring gears 38 is shown in FIGS. 2A, 2B and 2D. Each ring gear 38 includes an outer meshing member 38A engaged with the power output 24 (see FIG. 2B), and an inner meshing member 38B disposed radially inwardly of the outer meshing member 38A and in meshed engagement with one of the output gears 36C (see FIG. 2D). The inner meshing member 38B includes teeth, splines, etc. meshed with the output gear teeth 36E to receive a rotational input from the output gears 36C. The ring gears 38 in FIG. 2A are annular bodies with radially outer and inner meshing members 38A,38B. Each ring gear 38 in FIG. 2A includes a ring gear web 38C extending radially between the outer and inner meshing members 38A,38B. The outer and inner meshing members 38A,38B of each ring gear 38 are axially offset from one another. Other configurations for the ring gears 38 are possible.

The ring gears 38 in the illustrated embodiment indirectly engage the power output 24. The spline 24A of the power output 24 extends between the power shaft 16 and the ring gears 38, so as to convey a rotational output from the ring gears 38 to the power shaft 16. The spline 24A is a rotatable, annular component having a first end 24A' coupled to the propeller shaft 16 and a radially-outer second end 24A" in meshed engagement with the ring gears 38 (see FIGS. 2A, 2B and 2C). The second end 24A" of the spline 24A is in meshed engagement with the outer meshing members 38A of the ring gears 38. In FIG. 2A, the ring gears 38 are separate gears that are axially spaced apart from each other, and which are connected by the common spline 24, so that the ring gears 38 and the spline 24A rotate together about the center axis 32 of the epicyclic gear train 30 and output to the propeller shaft 16. As shown in FIG. 2A, the spline 24 is in meshed engagement with the ring gears 38 at a first axial position P1 that is axially spaced from axial positions P2,P3 of the meshed engagement of the ring gears 38 with the output gears 36C. In FIG. 2A, the first axial position P1 is located axially between the axial positions P2,P3 of the meshed engagement of the inner meshing members 38B with the output gear teeth 36E of the output gears 36C. The axially-spaced apart ring gears 38 thus have a common output location that is axially offset from where the ring gears 38 are engaged to the output gears 36C.

The spline 24A and ring gears 38 may have any suitable meshing structure to achieve the functionality described above. For example, and referring to FIGS. 2A, 2B and 2C, the spline 24A has a spline web 25A extending between the first and second ends 24A',24A". Referring to FIG. 2B, one of the ring gears 38' has an axial extension 38D at the radially outer end which has an orientation being substantially parallel to the center axis 32. The axial extension 38D extends from a first end at the radially outer end of the ring gear 38' to a second end which includes the teeth 38F of the outer meshing member 38A. The teeth 38F of the ring gear 38' mesh with the teeth of the second end 24A" of the spline 24A, and with the teeth of the other ring gear 38", such that the rotation of both the ring gears 38',38" drives the rotation of the spline 24A about the center axis 32. In an alternate embodiment, the ring gears 38 directly engage the power output 24 to provide a rotational output thereto.

One possible manner for operating the epicyclic gear train 30 is now described with reference to FIG. 2A. The sun gear 34 is engaged, via the coupling 22A, with the power input 22 to be driven thereby. The carrier 37 is fixed and made immobile, such that it does not rotate about the center axis 32. The carrier 37 can be fixed in place by, among other things, being mounted to surrounding structure or by using a brake of the epicyclic gear train 30. Since the carrier 37 is fixed in place, the compound planet gears 36 are prevented from rotating about the center axis 32. The rotational input provided by the sun gear 34 to the input gears 36B of the compound planet gears 36 causes the compound planet gears 36 to rotate about their respective planet gear axes 36A. The rotation of the output gears 36C of the compound planet gears 36 in turn causes the meshed ring gears 38 to rotate about the center axis 32. The ring gears 38 in the depicted embodiment engage the power output 24 via the spline 24A to rotate the propeller shaft 16. The epicyclic gear train 30 in the depicted embodiment may therefore be referred to as a "star" gear system, in which the carrier 37 is braked to slow and/or stop rotation thereof, while the compound planet gears 36 can still rotate about each of their respective axis 36A. The compound planet gears 36 in such a star gear configuration thus do not revolve around the sun gear 34 (i.e. the axes 36A of rotation of each compound planet gear 36 is fixed in space), but the compound planet gears 36 still individually rotate.

Still referring to FIG. 2A, the sun gear 34 is driven in a first rotational direction R1 about the center axis 32, and the star type arrangement of the compound planet gears 36 means that they will cause the ring gears 38, and thus the power output 24 and the propeller shaft 16, to rotate in a second rotational direction R2 opposite to the first rotational direction R1. The epicyclic gear train 30 of FIG. 2A therefore reverses the rotation direction of the output relative to the input. In contrast, in a conventional planetary type gear system, the ring gear is normally fixed in place, and the planet gears rotate about their own axes and about the axis of the planetary gear system, such that the rotational direction of the input is the same as the rotational direction of the output.

Referring to FIGS. 2A and 2D, each of the compound planet gears 36 is mounted about an oil-film bearing 40. The bearing 40 is fixed to surrounding support structure, such as the casing or the carrier 37, so that it does not displace during rotation of the compound planet gears 36 about their respective planet gear axes 36A. The bearings 40 are coaxial with each of the compound planet gears 36 about their planet gear axes 36A. In the illustrated embodiment, the bearings 40 are journal or rotary bearings, which support the compound planet gears 36 during their rotation. In FIGS. 2A and 2D, the oil-film bearing 40 is mounted within the central cavity 36H of the annular body 36F of each compound planet gear 36, and releases a thin film of oil or other suitable fluid along the inner journal surface 36G of the body 36F for lubrication. The oil-film bearing 40 may help the arrangement of the compound planet gears 36 in the epicyclic gear train 30 to occupy less space or volume.

Thus the axial spacing apart of the output gears 36C allows for the "split" ring gears 38 shown in FIG. 2A, where both are disposed symmetrically on each axial side of the bearings 40, so that load is applied uniformly through the planetary gear axes 36A, and load asymmetry may be avoided. The epicyclic gear train 30 is thus an arrangement of a star epicyclic system, combining compound planet gears 36 and oil film bearing 40 with balanced load from two ring gears 38. This contrasts with some conventional planetary gear systems, in which an unequal planet radial load is applied longitudinally.

FIG. 3 is a perspective view of the epicyclic gear train 30 showing the sun gear 34, the compound planet gears 36, and the ring gears 38. The carrier 37 is omitted from FIG. 3 for clarity. The sun gear teeth 34A are meshed with the input gear teeth 36D of the input gear 36B of each of the compound planet gears 36 to transmit rotation from the sun gear 34 to the compound planet gears 36. The inner meshing members 38B of the ring gears 38 are meshed with the output gear teeth 36E of the output gears 36C of each of the compound planet gears 36 to receive a rotational input from the output gears 36C. The outer meshing members 38A of the ring gears 38 are shown. In FIG. 3, the ring gear 38' is shown without the axial extension 38D for clarity. Each compound planet gear 36 is mounted about the oil-film bearing 40.

Referring to FIG. 2A, there is also disclosed a method of operating the RGB 20. The method includes driving the sun gear 34 to rotate the input gear 36B of the compound planet gears 36, and to rotate the axially spaced-apart output gears 36C. Rotation of the output gears 36C rotates the ring gears 38 about the center axis 32 of the epicyclic gear train 30.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An aircraft engine reduction gearbox, comprising:
a power input and a power output; and
an epicyclic gear train engaged with the power input and the power output, the epicyclic gear train including:
a sun gear engaged with the power input and centrally disposed defining a center axis of the epicyclic gear train;
compound planet gears mounted to a carrier and rotatable about respective planet gear axes, each compound planet gear having an input gear in meshed engagement with the sun gear, and output gears axially spaced from the input gear; and
ring gears axially spaced apart from each other, the ring gears rotatable about the center axis and engaged with the power output, each ring gear includes an outer meshing member engaged with the power output, and an inner meshing member disposed radially inwardly of the outer meshing member and in meshed engagement with one of the output gears.

2. The aircraft engine reduction gearbox of claim 1, wherein the carrier is fixed, the sun gear being engaged with the power input to be driven thereby in a first rotational direction, and cause the ring gears to rotate about the center axis and drive the power output in a second rotational direction opposite to the first rotational direction.

3. The aircraft engine reduction gearbox of claim 1, wherein the epicyclic gear train is the only epicyclic gear train of the aircraft engine reduction gearbox.

4. The aircraft engine reduction gearbox of claim 1, wherein the input gear is disposed axially between the output gears.

5. The aircraft engine reduction gearbox of claim 1, wherein each of the compound planet gears is mounted about an oil-film bearing.

6. The aircraft engine reduction gearbox of claim 5, wherein each compound planet gear includes an annular body defining an inner journal surface delimiting a cavity of the annular body, the oil-film bearing disposed in the cavity in engagement with the inner journal surface.

7. The aircraft engine reduction gearbox of claim 1, comprising a spline in meshed engagement with the ring gears, and engaged with the power output.

8. The aircraft engine reduction gearbox of claim 7, wherein the spline is in meshed engagement with the ring gears at a first axial position being axially spaced from axial positions of the meshed engagement of the ring gears with the output gears.

9. The aircraft engine reduction gearbox of claim 8, wherein the first axial position is axially between the axial positions of the meshed engagement of the ring gears with the output gears.

10. The aircraft engine reduction gearbox of claim 1, wherein a diameter of the input gear is greater than a diameter of the output gears.

11. The aircraft engine reduction gearbox of claim 1, wherein the power output includes an output shaft, a passage extending radially through the output shaft to an opening at a radially-outer surface of the output shaft.

12. The aircraft engine reduction gearbox of claim 1, wherein each of the compound planet gears is mounted about an oil-film bearing, the oil-film bearing including a bearing shaft extending along one of the planet gear axes between opposed axial ends, one or more annular grooves defined in each of the axial ends of the bearing shaft.

13. A method of operating a reduction gearbox of an aircraft engine, the reduction gearbox having an epicyclic gear train with a sun gear, compound planet gears, and axially spaced-apart ring gears, the method comprising: driving the sun gear to rotate an input gear of the compound planet gears, and to rotate output gears of the compound planet gears axially spaced from the input gear, rotation of the output gears rotating a radially-inner portion of the ring gears meshed with the output gears about a center axis of the epicyclic gear train, and rotating a radially-outer portion of the ring gears about the center axis.

14. The method of claim 13, wherein driving the sun gear includes stopping rotation of the compound planet gear about the center axis of the epicyclic gear train.

15. The method of claim 13, wherein driving the sun gear includes rotating the sun gear in a first rotational direction to rotate the ring gears in a second rotational direction opposite to the first rotational direction.

16. The method of claim 13, comprising driving only one of the epicyclic gear train of the reduction gearbox.

17. The method of claim 13, wherein driving the sun gear includes rotating the ring gears to drive a power output at a first axial position, and driving the sun gear includes rotating the output gears to rotate the ring gears at axial positions being axially spaced from the first axial position.

18. The method of claim 17, wherein the first axial position is axially between the axial positions.

* * * * *